US011973462B1

(12) United States Patent
Chen

(10) Patent No.: US 11,973,462 B1
(45) Date of Patent: Apr. 30, 2024

(54) AXIAL DIODE JUNCTION BOX AND METHOD FOR MANUFACTURING THE SAME

(71) Applicant: ZERUN CO., LTD, Changzhou (CN)

(72) Inventor: Zepeng Chen, Changzhou (CN)

(73) Assignee: ZERUN CO., LTD, Jiangsu (CN)

( * ) Notice: Subject to any disclaimer, the term of this patent is extended or adjusted under 35 U.S.C. 154(b) by 0 days.

(21) Appl. No.: 18/025,258

(22) PCT Filed: Sep. 6, 2021

(86) PCT No.: PCT/CN2021/116761
§ 371 (c)(1),
(2) Date: Mar. 8, 2023

(87) PCT Pub. No.: WO2023/010645
PCT Pub. Date: Feb. 9, 2023

(30) Foreign Application Priority Data

Aug. 2, 2021 (CN) .......................... 202110881967.5

(51) Int. Cl.
*H02S 40/34* (2014.01)
(52) U.S. Cl.
CPC .................................... *H02S 40/34* (2014.12)
(58) Field of Classification Search
CPC .......... H02S 40/34; H02S 40/00; H02S 40/30; H02S 40/20; H02G 3/08; H02G 3/081;
(Continued)

(56) References Cited

U.S. PATENT DOCUMENTS

| 5,903,584 A | 5/1999 | Jiahn-Chang |
| 6,254,423 B1 * | 7/2001 | Lin .......................... H01R 4/02 174/16.3 |

(Continued)

FOREIGN PATENT DOCUMENTS

| CN | 2370569 | 3/2000 |
| CN | 202076292 | 12/2011 |

(Continued)

OTHER PUBLICATIONS

China National Intellectual Property Office, First Office action issued in CN 202110881967.5 mailed Sep. 8, 2021, 6 pages.
(Continued)

*Primary Examiner* — Angel R Estrada
(74) *Attorney, Agent, or Firm* — Rankin, Hill & Clark LLP

(57) ABSTRACT

The present application discloses an axial diode junction box and a method for manufacturing the same, comprising an axial diode and a junction box body, wherein the axial diode is mounted inside the junction box body; the axial diode comprises a diode body, a first pin, and a second pin, one end of the diode body is connected to the first pin, the other end of the diode body is connected to the second pin, and a direction where the diode body is close to the junction box body is defined as a front direction; the first pin comprises a first connection portion and a first flat portion, one end of the first connection portion is connected to one end of the diode body, and the other end of the first connection portion is connected to the first flat portion; the second pin comprises a second connection portion and a second flat portion, one end of the second connection portion is connected to the other end of the diode body, and the other end of the second connection portion is connected to the second flat portion; and the diode body is clamped to the junction box body. The present application can simplify a production process, (Continued)

reduce a product cost, improve the product reliability, and improve the production efficiency of a production line.

8 Claims, 6 Drawing Sheets

(58) Field of Classification Search
CPC .......... H05K 5/00; H05K 5/02; H05K 5/0217; H05K 5/0247; H05K 5/04; H05K 7/00; H01L 29/861
USPC .......... 174/50, 535, 520, 559; 361/600, 601, 361/641, 679.01
See application file for complete search history.

(56) References Cited

U.S. PATENT DOCUMENTS

| | | | | |
|---|---|---|---|---|
| 7,365,965 B2* | 4/2008 | Higashikozono | ...... | H01R 9/223 361/710 |
| 7,982,308 B2* | 7/2011 | Sheu | ........ | H01L 33/62 257/688 |
| 8,471,145 B2* | 6/2013 | Suzuki | ........ | H02S 40/34 174/67 |
| 8,476,539 B2* | 7/2013 | Ilchev | ........ | H01L 31/02008 439/873 |
| 8,748,743 B2* | 6/2014 | Xiao | ........ | H02S 40/34 174/559 |
| 9,647,441 B2* | 5/2017 | Tanaka | ........ | H02G 3/18 |
| 9,866,169 B1* | 1/2018 | Li | ........ | H02G 3/081 |
| 11,777,444 B2* | 10/2023 | Pomerantz | ........ | H02G 3/16 174/50 |

FOREIGN PATENT DOCUMENTS

| | | |
|---|---|---|
| CN | 202473989 | 10/2012 |
| CN | 204257664 | 4/2015 |
| CN | 210435251 | 5/2020 |
| CN | 210435251 U | 5/2020 |
| CN | 213125974 | 5/2021 |
| CN | 213125974 U | 5/2021 |
| CN | 113328698 | 8/2021 |

OTHER PUBLICATIONS

International Search Report filed in PCT/CN2021/116761 mailed Apr. 29, 2022.

* cited by examiner

Front Direction

Front Direction placing an axial diode into a stamping die, bending and then stamp-flattening a first pin of the axial diode to obtain a first flat portion, and bending and then stamp-flattening a second pin of the axial diode to obtain a second flat portion; or placing an axial diode into a stamping die, stamp-flattening a first pin of the axial diode and then bending the flattened portion to obtain a first flat portion, and stamp-flattening a second pin of the axial diode and then bending the flattened portion to obtain a second flat portion; — S1

The shaped axial diode is mounted into a junction box body — S2

AXIAL DIODE JUNCTION BOX AND METHOD FOR MANUFACTURING THE SAME

TECHNICAL FIELD

The present application relates to the technical field of photovoltaic junction boxes, in particular to an axial diode junction box and a method for manufacturing the same.

BACKGROUND

As the application of solar power generation becomes increasingly common, innovations in junction boxes closely related to the application occur constantly. The solar power generation adopts a plurality sets of solar cell module arranged an array to convert sunlight into electricity. Each set of solar module is connected to a junction box, and the junction box is connected to other part of a solar power system.

The diode is a key component in the photovoltaic cell junction box. The diode may generate heat when it is in use. If the heat cannot be dissipated in time, it may affect the life of the diode, violating the requirements of electrical safety. Moreover, with the increasing demand for high-current photovoltaic junction boxes in the market, since ordinary axial diodes cannot satisfy the requirements of high currents, more and more manufacturers use modular diodes instead of axial diodes. However, the use of modular diodes requires relating devices for packaging and testing the modular diodes, leading to a high cost in the devices and a long test cycle. The production process of the modular diodes applicable to high currents are complicated and with high production costs.

BRIEF SUMMARY

The technical problem to be solved by the present application is as follows: in order to solve the technical problem of complicated and high cost of mounting process of application of modular diodes to high currents use in the prior art, the present application provides an axial diode junction box and a method for manufacturing the same, to improve heat dissipation efficiency of the diode to satisfy the use for high currents and to realize a simple mounting process and a low cost.

The technical solution employed in the present application to solve the technical problem is: an axial diode junction box, including an axial diode and a junction box body, wherein the axial diode is mounted inside the junction box body; the axial diode includes a diode body, a first pin, and a second pin, one end of the diode body is connected to the first pin, and the other end of the diode body is connected to the second pin; a direction where the diode body is close to the junction box body is defined as a front direction; the first pin includes a first connection portion and a first flat portion, one end of the first connection portion is connected to one end of the diode body, and the other end of the first connection portion is connected to the first flat portion; the second pin includes a second connection portion and a second flat portion, one end of the second connection portion is connected to the other end of the diode body, and the other end of the second connection portion is connected to the second flat portion; and the diode body is clamped to the junction box body.

In the axial diode junction box of the present application, by pressing a portion of the first pin and a portion of the second pin of the axial diode into a flat shape, the first flat portion and the second flat portion can be directly used as welding surfaces that can be directly welded with bus bars, saving extra connection members (such as conductive sheets) arranged in the junction box and thereby reducing the cost. The first flat portion and the second flat portion can increase heat dissipation areas of the axial diode and shorten heat dissipation paths (e.g., an original heat dissipation path from the pin to the conductive sheet is shortened to a direct heat dissipation by the pin), improve a heat dissipation effect and thus improve power utilization. Therefore, the axial diode of the present application may satisfy high currents (20A-35A) and can replace a modular diode, thereby reducing the production cost and simplifying mounting steps.

More specifically, the length of the first connection portion is at least 1 mm, and the length of the second connection portion is at least 1 mm. In this way, the diode body can be prevented from being damaged during stamping.

More specifically, the first flat portion and the second flat portion both are in a shape of a flat plate, and when the diode body is clamped to the junction box body, a plane where the first flat portion is located is parallel to a plane of the bottom of the junction box body, and a plane where the second flat portion is located is parallel to the plane of the bottom of the junction box body.

More specifically, the first flat portion and the second flat portion both are L-shaped, and when the diode body is clamped to the junction box body, the first flat portion is perpendicular to a plane of the bottom of the junction box body, and the second flat portion is perpendicular to the plane of the bottom of the junction box body.

Furthermore, in order to increase a welding area and improve the welding reliability, the width of the first flat portion is at least 2 mm, the thickness of the first flat portion is at least 0.2 mm, the width of the second flat portion is at least 2 mm, and the thickness of the second flat portion is at least 0.2 mm.

Furthermore, in order to increase a welding area and improve the welding reliability, the length of the first flat portion is at least 2 mm, the length of the second flat portion is at least 2 mm, taking a direction perpendicular to the diode body as a front direction, a distance between the first connection portion and a rear end of the first flat portion is d1, a distance between the second connection portion and a rear end of the second flat portion is d2, the distance d1 is at least 1 mm, and the distance d2 is at least 1 mm.

More specifically, taking a direction perpendicular to the diode body as a front direction, a portion of the first flat portion is bent backward to form an L-shape, and a portion of the second flat portion is bent backward to form an L-shape; the first flat portion includes a first horizontal portion and a first vertical portion, one end of the first horizontal portion is fixedly connected to the first connection portion, and the other end of the first horizontal portion is perpendicularly and fixedly connected to a front end of the first vertical portion; the second flat portion includes a second horizontal portion and a second vertical portion, one end of the second horizontal portion is fixedly connected to the second connection portion, and the other end of the second horizontal portion is perpendicularly and fixedly connected to a front end of the second vertical portion; the first horizontal portion, the first vertical portion, the second horizontal portion, and the second vertical portion are all in the shape of a flat plate; a plane where the first horizontal portion is located is perpendicular to the plane of the bottom of the junction box body, a plane where the first vertical portion is located is perpendicular to the plane of the bottom of the junction box body, a plane where the second horizontal portion is located is perpendicular to the plane of the bottom of the junction box body, and a plane where the second vertical portion is located is perpendicular to the plane of the bottom of the junction box body.

Furthermore, in order to increase a welding area and improve the welding reliability, the length of the first vertical portion is at least 2 mm, and the length of the second vertical portion is at least 2 mm.

More specifically, a first hook portion, a support base, a second hook portion, and a block plate are fixedly provided at the bottom of the junction box body; the first hook portion is close to a front end of the junction box body, the second hook portion is close to a rear end of the junction box body, and the block plate is located in the middle of the junction box body; the first hook portion includes a left first hook portion and a right first hook portion, the left first hook portion and the right first hook portion are arranged in parallel, a distance between the left first hook portion and the right first hook portion is d3, the length of the diode body is d4, the distance d3 matches the length d4, and a plane A where the left first hook portion and the right first hook portion are located is parallel to a plane B where the block plate is located; the support base includes a left support base and a right support base, and the left support base and the right support base are arranged opposite each other; the second hook portion includes a left second hook portion and a right second hook portion, the left second hook portion and the right second hook portion are arranged opposite each other, and a distance between the left second hook portion and the right second hook portion is greater than the distance d3; when the axial diode is mounted in the junction box body, the diode body is located between the left first hook portion and the right first hook portion, an outer wall of the diode body abuts against the block plate, the first connection portion abuts against the left first hook portion, the second connection portion abuts against the right first hook portion, the first flat portion is in contact with an upper end surface of the left support base, the second flat portion is in contact with an upper end surface of the right support base, the left second hook portion limits the rear end of the first flat portion, and the right second hook portion limits the rear end of the second flat portion. The first hook portion, the second hook portion, and the block plate can fix and position the axial diode, and the support base can support the first flat portion and the second flat portion, while making the first flat portion and the second flat portion overhead with respect to the bottom of the junction box body, increasing a heat dissipation space and thereby improving the heat dissipation effect of the first flat portion and the second flat portion.

More specifically, a third hook portion, a fourth hook portion, a first positioning column, a second positioning column, and a support block are fixedly provided at the bottom of the junction box body; the third hook portion includes a left third hook portion and a right third hook portion, the left third hook portion and the right third hook portion are arranged in parallel, the fourth hook portion includes a left fourth hook portion and a right fourth hook portion, the left fourth hook portion and the right fourth hook portion are arranged in parallel, the left third hook portion and the left fourth hook portion are arranged opposite each other, and the right third hook portion and the right fourth hook portion are arranged opposite each other; a plane where the left third hook portion and the left fourth hook portion are located is C, a plane where the right third hook portion and the right fourth hook portion are located is D, the plane C is parallel to the plane D, and a distance between the plane C and the plane D is d5, the length of the diode body is d4, and the distance d5 matches the length d4; the first positioning column and the second positioning column are arranged in a staggered manner, a distance between a left end surface of the first positioning column and a right end surface of the second positioning column is d6, the length of the first horizontal portion is d7, and the distance d6 matches the length d7; when the axial diode is mounted in the junction box body, the diode body is located between the plane C and plane D, the first connection portion is located between the left third hook portion and the left fourth hook portion, the second connection portion is located between the right third hook portion and the right fourth hook portion, the first horizontal portion is located between a rear end surface of the first positioning column and a front end surface of the second positioning column, and the first vertical portion abuts against the support block. The third hook portion and the fourth hook portion can fix the diode body, the first positioning column and the second positioning column can guide and position the first flat portion, and the support block can support the first flat portion, while making the first flat portion overhead with respect to the bottom of the junction box body, accelerating heat dissipation of the first flat portion and the second flat portion and thereby improving the heat dissipation effect.

A method for manufacturing the axial diode junction box as described above includes the following steps:

S1: placing an axial diode into a stamping die, bending and then stamp-flattening a first pin of the axial diode to obtain a first flat portion, and bending and then stamp-flattening a second pin of the axial diode to obtain a second flat portion; or placing an axial diode into a stamping die, stamp-flattening a first pin of the axial diode and then bending the flattened portion to obtain a first flat portion, and stamp-flattening a second pin of the axial diode and then bending the flattened portion to obtain a second flat portion; and S2: mounting the shaped axial diode into a junction box body.

The beneficial effects of the present application are as follows: in the axial diode junction box of the present application, by pressing portions of the first pin and the second pin of the axial diode into a flat shape, the first flat portion and the second flat portion can be directly used as welding surfaces, saving extra connection members (such as conductive sheets) arranged in the junction box and thereby reducing the cost. The first flat portion and the second flat portion can increase a heat dissipation area of the axial diode and shorten heat dissipation paths (e.g., an original heat dissipation path from the pin to the conductive sheet is shortened to a heat dissipation path directly achieved by the pin), improving a heat dissipation effect and thus improving power utilization. Therefore, the axial diode of the present application is applicable to high currents (20A-35A) and can replace a modular diode, thereby reducing the production cost and simplifying mounting steps. In the present application, the first flat portion and the second flat portion can be used as the welding surfaces of the axial diode, and the bus bars and cables can be directly welded with the first flat portion and the second flat portion, so as to reduce the number of welding points inside the junction box, reduce the number of components and parts inside the junction box, simplify the production process, reduce the product cost, improve product reliability, and improve the production efficiency of the production line.

BRIEF DESCRIPTION OF THE DRAWINGS

The present application is described in detail below with reference to the drawings and embodiments.

FIG. 12 is a flowchart of a method for manufacturing an axial diode junction box of the present application.

Figure 1:
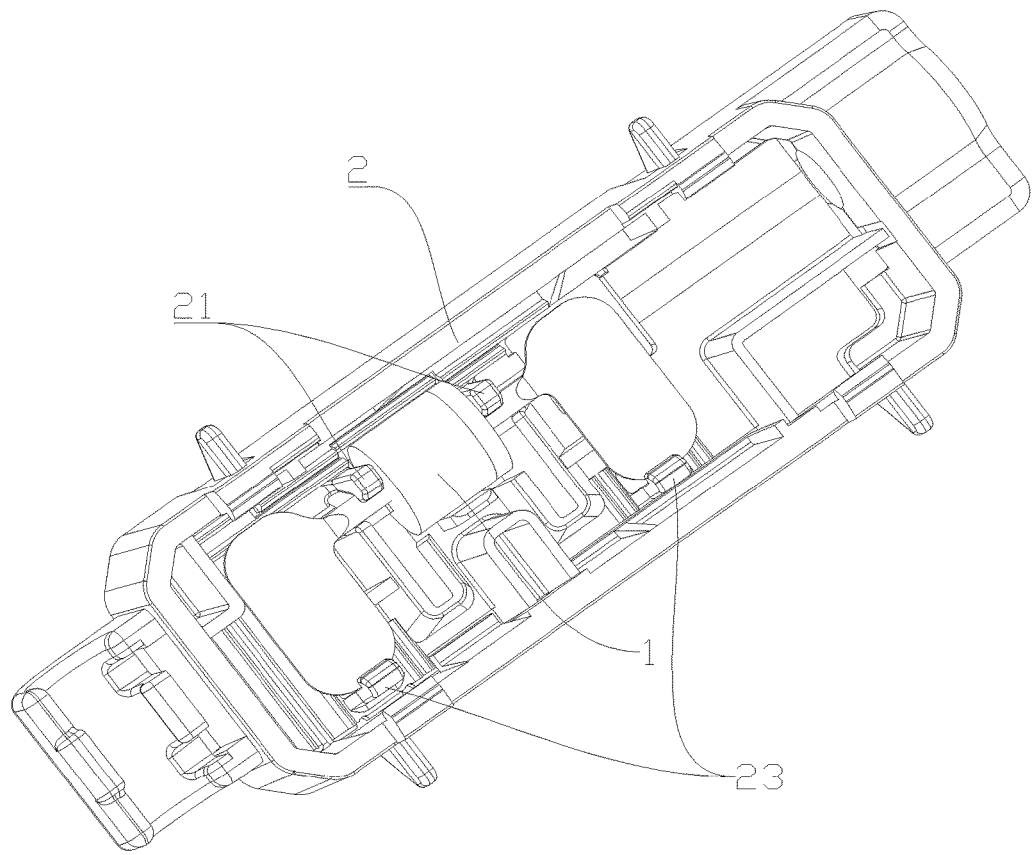
FIG. 1 is a structural diagram of an axial diode junction box of the present application.
Figure 2:
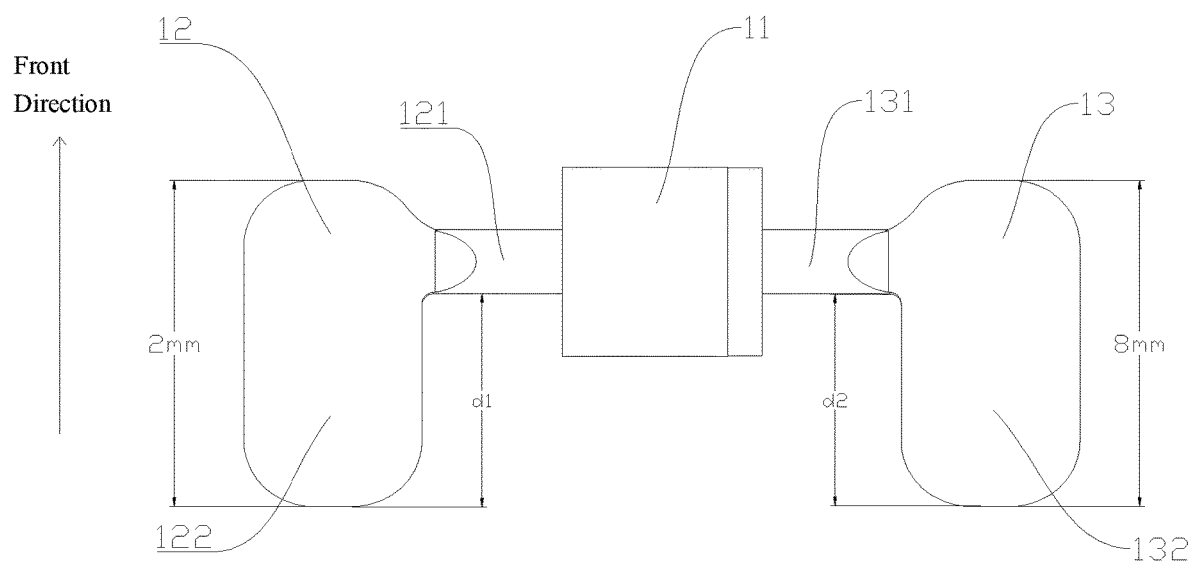
FIG. 2 is a structural diagram of an axial diode according to embodiment 1 of the present application.
Figure 3:
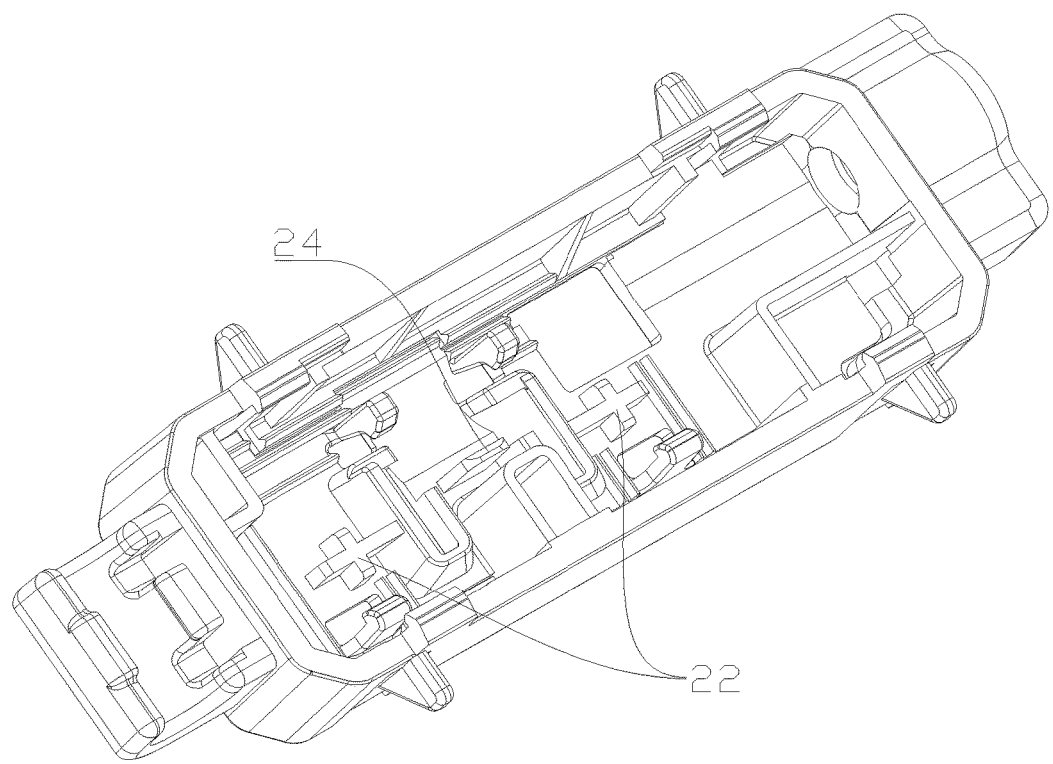
FIG. 3 is a perspective view of a junction box body according to embodiment 1 of the present application.
Figure 4:
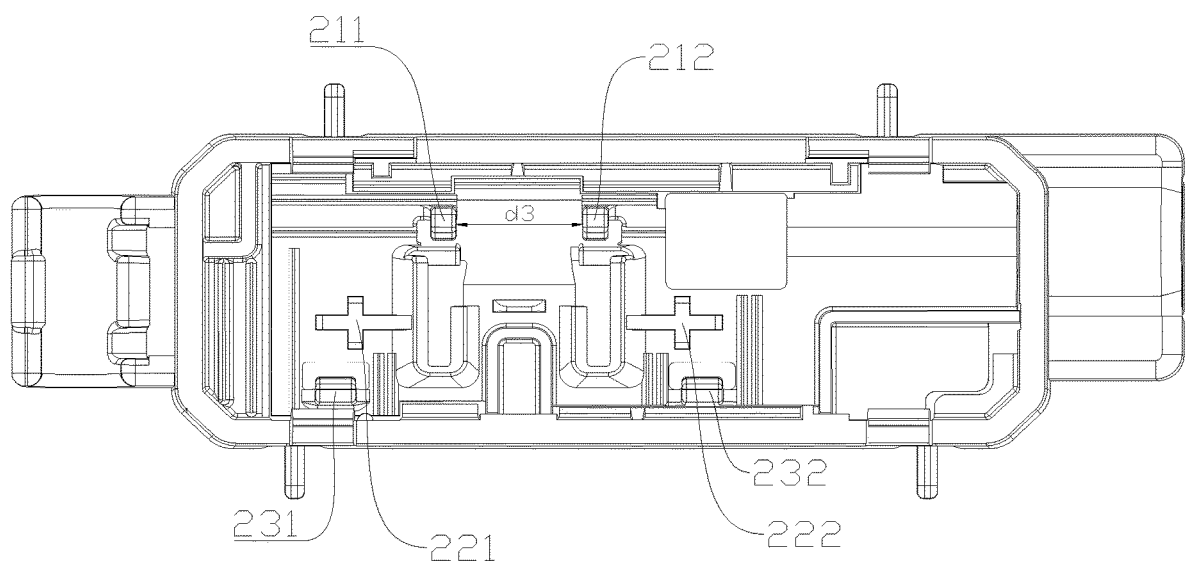
FIG. 4 is a front view of the junction box body according to embodiment 1 of the present application.
Figure 5:
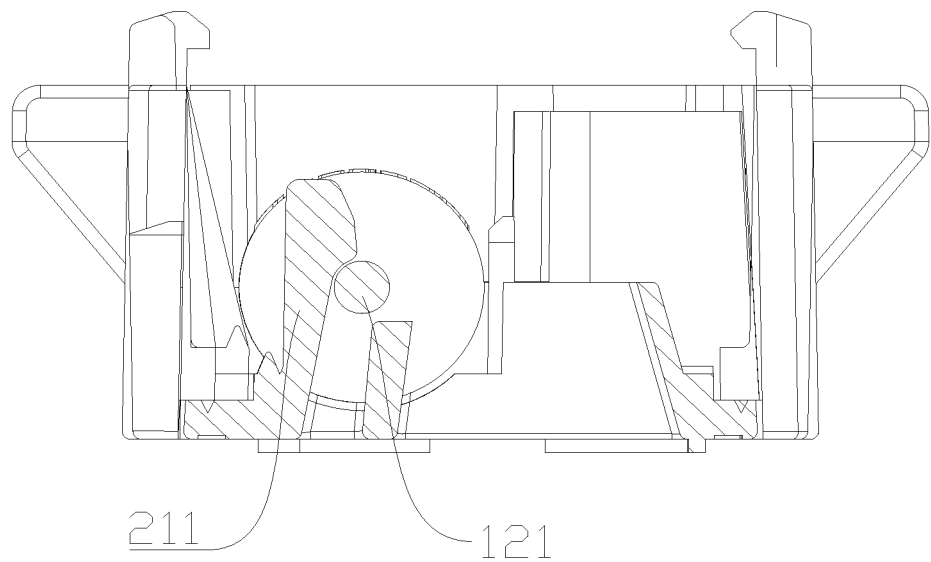
FIG. 5 is a sectional view of embodiment 1 of the present application.
Figure 6:
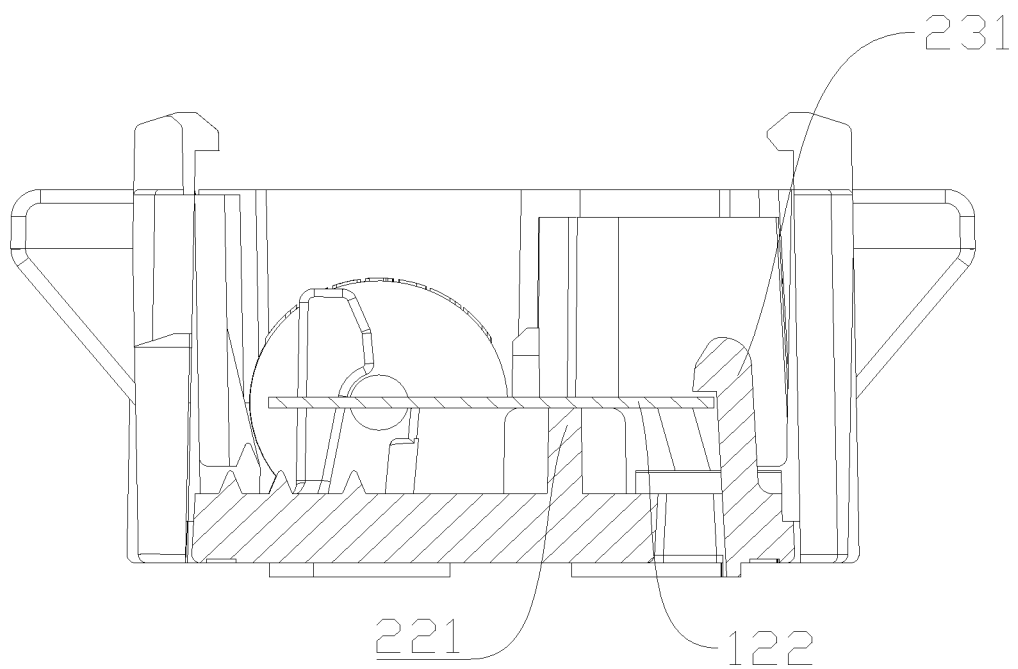
FIG. 6 is another sectional view of embodiment 1 of the present application.
Figure 7:
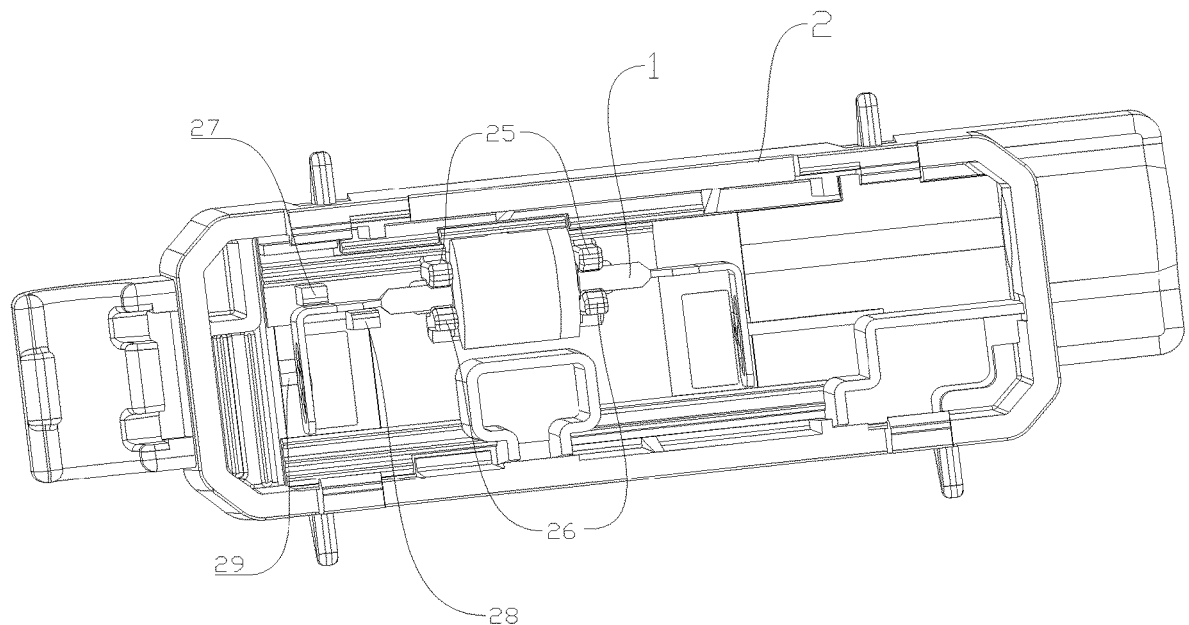
FIG. 7 is another structural diagram of an axial diode junction box of the present application.
Figure 8:
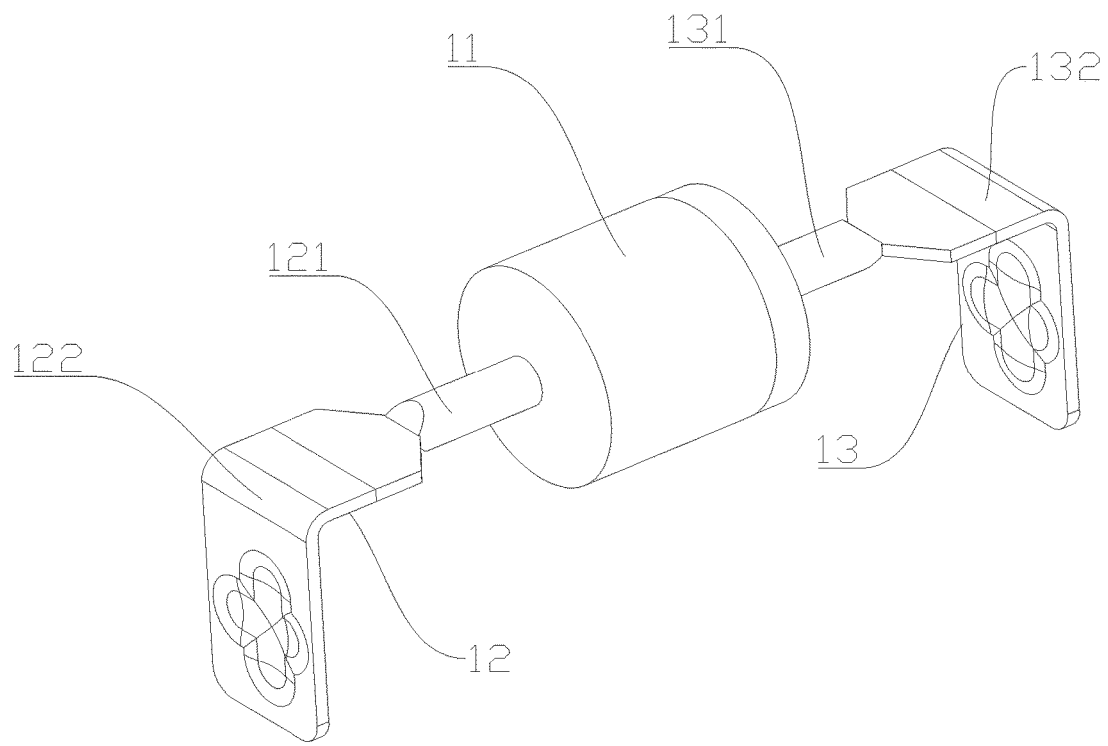
FIG. 8 is a structural diagram of an axial diode according to embodiment 2 of the present application.
Figure 9:
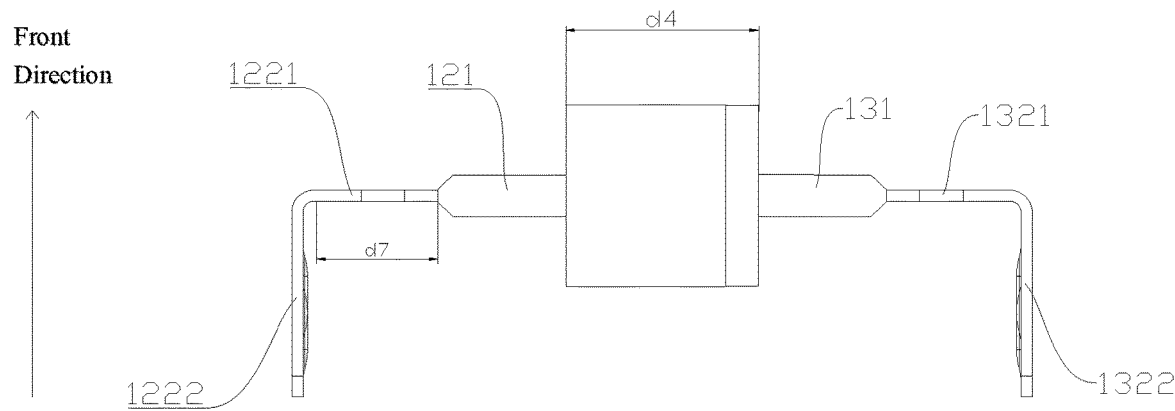
FIG. 9 is a front view of the axial diode according to embodiment 2 of the present application.
Figure 10:
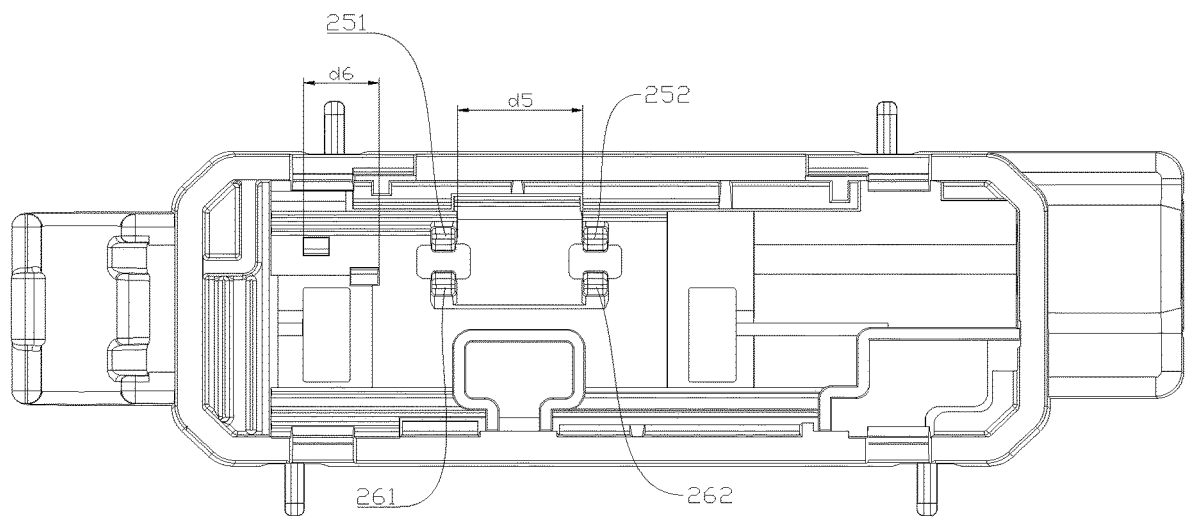
FIG. 10 is a structural diagram of a junction box body according to embodiment 2 of the present application.

In the drawings: 1. axial diode, 2. junction box body, 11. diode body, 12. first pin, 13. second pin, 121. first connection portion, 122. first flat portion, 131. second connection portion, 132. second flat portion, 1221. first horizontal portion, 1222. first vertical portion, 1321. second horizontal portion, 1322. second vertical portion, 21. first hook portion, 22. support base, 23. second hook portion, 24. block plate, 211. left first hook portion, 212. right first hook portion, 221, left support base, 222, right support base, 231, left second hook portion, 232, right second hook portion, 25, third hook portion, 26, fourth hook portion, 27, first positioning column, 28, second positioning column, 29, support block, 251, left third hook portion, 252, right third hook portion, 261, left fourth hook portion, 262, right fourth hook portion.

DETAILED DESCRIPTION OF THE DISCLOSURE

The present application is described in detail below with reference to the drawings. These drawings are simplified schematic diagrams, which illustrate the basic structure of the present application in a schematic way only and thus show only the composition related to the present application.

In the description of the present application, it should be understood that the orientation or position relationship indicated by the terms "center", "longitudinal", "lateral", "length", "width", "thickness", "upper", "lower", "front", "rear", "left", "right", "vertical", "horizontal", "top", "bottom", "inner", "outer", "clockwise", "counterclockwise", "axial", "radial", "circumferential" etc. is based on the orientation or position relationship shown in the drawings, intended only for the convenience of describing the present application and simplifying the description, rather than indicating or implying that the apparatus or element referred to necessarily has a specific orientation or is configured or operated in a specific orientation, and thus cannot be construed as a limitation on the present application. In addition, the features defined by "first" and "second" may explicitly or implicitly include one or more of these features. In the description of the present application, unless otherwise stated, "a plurality of" means "two or more".

In the description of the present application, it should be noted that, unless otherwise clearly specified and defined, the terms "mounting", "coupling", and "connecting" should be understood in a broad sense, for example, it can be a fixed connection, a detachable connection, or an integrated connection, can be a mechanical connection or an electrical connection, or can be a direct connection, an indirect connection implemented by means of an intermedium, or an internal connection between two components. Those skilled in the art could understand the specific meanings of the above terms in the present application on the basis of specific situations.

Embodiment 1

Referring to FIGS. 1-6, an axial diode junction box includes an axial diode 1 and a junction box body 2, wherein the axial diode 1 is mounted inside the junction box body 2. The axial diode 1 includes a diode body 11, a first pin 12, and a second pin 13, one end of the diode body 11 is connected to the first pin 12, and the other end of the diode body 11 is connected to the second pin 13. A direction where the diode body 1 is close to the junction box body 2 is defined as a front direction. The first pin 12 includes a first connection portion 121 and a first flat portion 122, one end of the first connection portion 121 is connected to one end of the diode body 11, and the other end of the first connection portion 121 is connected to the first flat portion 122. The second pin 13 includes a second connection portion 131 and a second flat portion 132, one end of the second connection portion 131 is connected to the other end of the diode body 11, and the other end of the second connection portion 131 is connected to the second flat portion 132. The diode body 11 is clamped to the junction box body 2.

The length of the first connection portion 121 is at least 1 mm, and the length of the second connection portion 131 is at least 1 mm. In this way, on the one hand, the diode body 11 is not affected during a stamping process, and on the other hand, a bus bar can be conveniently mounted onto the first connection portion 121 and the second connection portion 131.

The first flat portion 122 and the second flat portion 132 both are in the shape of a flat plate, and when the diode body 11 is clamped to the junction box body 2, a plane where the first flat portion 122 is located is parallel to a plane of the bottom of the junction box body 2, and a plane where the second flat portion 132 is located is parallel to the plane of the bottom of the junction box body 2.

The width of the first flat portion 122 is at least 2 mm, the thickness of the first flat portion 122 is at least 0.2 mm, the width of the second flat portion 132 is at least 2 mm, and the thickness of the second flat portion 132 is at least 0.2 mm. The width and thickness are configured so that not only the strength of the first flat portion 122 and the second flat portion 132 can be guaranteed, but also the first flat portion 122 and the second flat portion 132 have enough welding surfaces to facilitate welding with bus bars or cables.

The length of the first flat portion 122 is at least 2 mm, e.g., 8 mm, the length of the second flat portion 132 is at least 2 mm, e.g., 8 mm, a distance between the first connection portion 121 and a rear end of the first flat portion 122 is d1, a distance between the second connection portion 131 and a rear end of the second flat portion 132 is d2, the distance d1 is at least 1 mm, e.g., 6 mm, and the distance d2 is at least 1 mm, e.g., 6 mm. d1 and d2 are at least 1 mm so as to increase a welding area with respect to the bus bars and improve welding reliability and firmness.

A first hook portion 21, a support base 22, a second hook portion 23, and a block plate 24 are fixedly provided at the bottom of the junction box body 2. The first hook portion 21 is close to a front end of the junction box body 2, the second hook portion 23 is close to a rear end of the junction box body 2, and the block plate 24 is located in the middle of the junction box body 2. The first hook portion 21 includes a left first hook portion 211 and a right first hook portion 212, the left first hook portion 211 and the right first hook portion 212 are arranged in parallel, a distance between the left first hook portion 211 and the right first hook portion 212 is d3, the length of the diode body 11 is d4, and the distance d3 matches the length d4, so as to facilitate mounting of the diode body 11 and position the diode body 11. A plane A where the left first hook portion 211 and the right first hook portion 212 are located is parallel to a plane B where the block plate 24 is located, and when the diode body 11 is mounted onto the left first hook portion 211 and the right first hook portion 212, the block plate 24 can position and support the diode body 11. The support base 22 includes a left support base 221 and a right support base 222, and the left support base 221 and the right support base 222 are arranged opposite each other. the second hook portion 23 includes a left second hook portion 231 and a right second hook portion 232, the left second hook portion 231 and the right second hook portion 232 are arranged opposite each other, and a distance between the left second hook portion 231 and the right second hook portion 232 is greater than the distance d3. When the axial diode 1 is mounted in the junction box body 2, the diode body 11 is located between the left first hook portion 211 and the right first hook portion 212, an outer wall of the diode body 11 abuts against the block plate 24, the first connection portion 121 abuts against the left first hook portion 211, the second connection portion 131 abuts against the right first hook portion 212, the first flat portion 122 is in contact with an upper end surface of the left support base 221, the second flat portion 132 is in contact with an upper end surface of the right support base 222, the left second hook portion 231 limits the rear end of the first flat portion 122, and the right second hook portion 232 limits the rear end of the second flat portion 132. In this embodiment, the support base 22 is a cross-shaped support base, so as to provide more firm support to the first flat portion 122 and the second flat portion 132.

Embodiment 2

Referring to FIGS. 7-10, an axial diode junction box includes an axial diode 1 and a junction box body 2, wherein the axial diode 1 is mounted inside the junction box body 2. The axial diode 1 includes a diode body 11, a first pin 12, and a second pin 13, one end of the diode body 11 is connected to the first pin 12, and the other end of the diode body 11 is connected to the second pin 13. A direction where the diode body 1 is close to the junction box body 2 is defined as a front direction. The first pin 12 includes a first connection portion 121 and a first flat portion 122, one end of the first connection portion 121 is connected to one end of the diode body 11, and the other end of the first connection portion 121 is connected to the first flat portion 122. The second pin 13 includes a second connection portion 131 and a second flat portion 132, one end of the second connection portion 131 is connected to the other end of the diode body 11, and the other end of the second connection portion 131 is connected to the second flat portion 132. The diode body 11 is clamped to the junction box body 2.

The length of the first connection portion 121 is at least 1 mm, and the length of the second connection portion 131 is at least 1 mm.

The first flat portion 122 and the second flat portion 132 both are L-shaped, and when the diode body 11 is clamped to the junction box body 2, the first flat portion 122 is perpendicular to a plane of the bottom of the junction box body 2, and the second flat portion 132 is perpendicular to the plane of the bottom of the junction box body 2.

The width of the first flat portion 122 is at least 2 mm, e.g., 6 mm, the thickness of the first flat portion 122 is at least 0.2 mm, the width of the second flat portion 132 is at least 2 mm, e.g., 6 mm, and the thickness of the second flat portion 132 is at least 0.2 mm.

A portion of the first flat portion 122 is bent backward to form an L-shape, and a portion of the second flat portion 132 is bent backward to form an L-shape. The first flat portion 122 includes a first horizontal portion 1221 and a first vertical portion 1222, one end of the first horizontal portion 1221 is fixedly connected to the first connection portion 121, and the other end of the first horizontal portion 1221 is perpendicularly and fixedly connected to a front end of the first vertical portion 1222. The second flat portion 132 includes a second horizontal portion 1321 and a second vertical portion 1322, one end of the second horizontal portion 1321 is fixedly connected to the second connection portion 131, and the other end of the second horizontal portion 1321 is perpendicularly and fixedly connected to a front end of the second vertical portion 1322. The first horizontal portion 1221, the first vertical portion 1222, the second horizontal portion 1321, and the second vertical portion 1322 are all in the shape of a flat plate. A plane where the first horizontal portion 1221 is located is perpendicular to the plane of the bottom of the junction box body 2, a plane where the first vertical portion 1222 is located is perpendicular to the plane of the bottom of the junction box body 2, a plane where the second horizontal portion 1321 is located is perpendicular to the plane of the bottom of the junction box body 2, and a plane where the second vertical portion 1322 is located is perpendicular to the plane of the bottom of the junction box body 2. The length of the first vertical portion 1222 is at least 2 mm, e.g., 6 mm, and the length of the second vertical portion 1322 is at least 2 mm, e.g., 6 mm.

A third hook portion 25, a fourth hook portion 26, a first positioning column 27, a second positioning column 28, and a support block 29 are fixedly provided at the bottom of the junction box body 2. The third hook portion 25 includes a left third hook portion 251 and a right third hook portion 252, and the left third hook portion 251 and the right third hook portion 252 are arranged in parallel. The fourth hook portion 26 includes a left fourth hook portion 261 and a right fourth hook portion 262, and the left fourth hook portion 261 and the right fourth hook portion 262 are arranged in parallel. The left third hook portion 251 and the left fourth hook portion 261 are arranged opposite each other, and the right third hook portion 252 and the right fourth hook portion 262 are arranged opposite each other. A plane where the left third hook portion 251 and the left fourth hook portion 261 are located is C, a plane where the right third hook portion 252 and the right fourth hook portion 262 are located is D, the plane C is parallel to the plane D, a distance between the plane C and the plane D is d5, the length of the diode body 11 is d4, and the distance d5 matches the length d4. The first positioning column 27 and the second positioning column 28 are arranged in a staggered manner, a distance between a left end surface of the first positioning column 27 and a right end surface of the second positioning column 28 is d6, the length of the first horizontal portion 1221 is d7, and the distance d6 matches the length d7. When the axial diode 1 is mounted in the junction box body 2, the diode body 11 is located between the plane C and plane D, the first connection portion 121 is located between the left third hook portion 251 and the left fourth hook portion 261, the second connection portion 131 is located between the right third hook portion 252 and the right fourth hook portion 262, the first horizontal portion 1221 is located between a rear end surface of the first positioning column 27 and a front end surface of the second positioning column 28, and the first vertical portion 1222 abuts against the support block 29.

Embodiment 3

Figure 11:
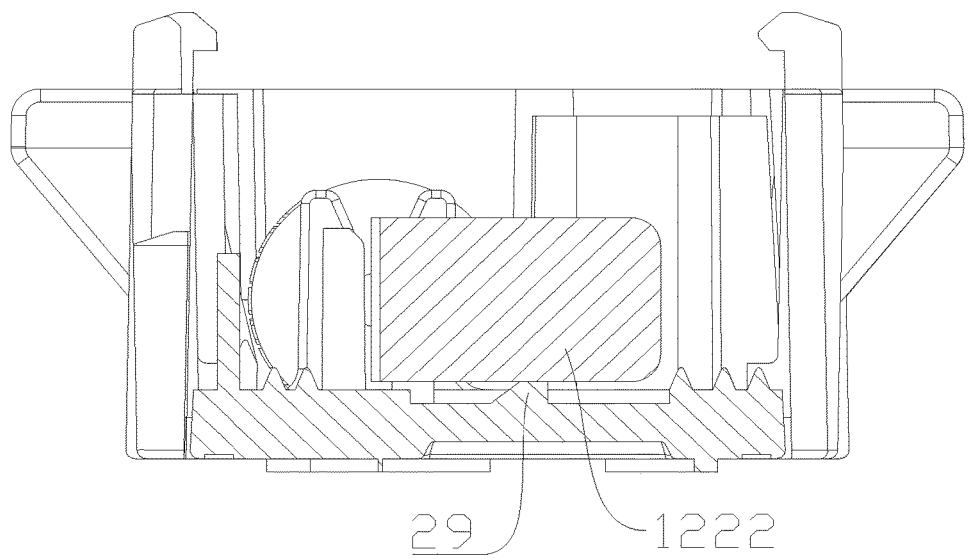
FIG. 11 is a sectional view of embodiment 2 of the present application.

Referring to FIG. 11, a method for manufacturing an axial diode junction box includes the following steps:

S1: An axial diode 1 is placed into a stamping die, a first pin 12 of the axial diode 1 is bent and then stamp-flattened to obtain a first flat portion 122, and a second pin 13 of the axial diode 1 is bent and then stamp-flattened to obtain a second flat portion 132.

Or, an axial diode 1 is placed into a stamping die, a first pin 12 of the axial diode 1 is stamp-flattened and then the flattened portion is bent to obtain a first flat portion 122, and a second pin 13 of the axial diode 1 is stamp-flattened and then the flattened portion is bent to obtain a second flat portion 132.

S2: The shaped axial diode 1 is mounted into a junction box body 2.

The axial diode junction boxes of embodiment 1 and embodiment 2 can be manufactured by steps S1-S2.

In view of the above ideal embodiments of the present application, based on the above description, those skilled in the art could make various changes and modifications without deviating from the technical idea of the present application. The technical scope of the present application is not limited to the content in the description, and shall be determined by the scope of the claims.

What is claimed is:

1. An axial diode junction box, comprising an axial diode and a junction box body, wherein the axial diode is mounted inside the junction box body; the axial diode comprises a diode body, a first pin, and a second pin, one end of the diode body is connected to the first pin, and the other end of the diode body is connected to the second pin; a direction where the diode body is close to the junction box body is defined as a front direction; the first pin comprises a first connection portion and a first flat portion, one end of the first connection portion is connected to one end of the diode body, and the other end of the first connection portion is connected to the first flat portion; the second pin comprises a second connection portion and a second flat portion, one end of the second connection portion is connected to the other end of the diode body, and the other end of the second connection portion is connected to the second flat portion; and the diode body is clamped to the junction box body, wherein the first flat portion and the second flat portion both are in a shape of a flat plate, and when the diode body is clamped to the junction box body, a plane where the first flat portion is located is parallel to a plane of the bottom of the junction box body, and a plane where the second flat portion is located is parallel to the plane of the bottom of the junction box body, or wherein the first flat portion and the second flat portion both are L-shaped, and when the diode body is clamped to the junction box body, the first flat portion is perpendicular to a plane of the bottom of the junction box body, and the second flat portion is perpendicular to the plane of the bottom of the junction box body, wherein a portion of the first flat portion is bent backward to form an L-shape, and a portion of the second flat portion is bent backward to form an L-shape; the first flat portion comprises a first horizontal portion and a first vertical portion, one end of the first horizontal portion is fixedly connected to the first connection portion, and the other end of the first horizontal portion is perpendicularly and fixedly connected to a front end of the first vertical portion; the second flat portion comprises a second horizontal portion and a second vertical portion, one end of the second horizontal portion is fixedly connected to the second connection portion, and the other end of the second horizontal portion is perpendicularly and fixedly connected to a front end of the second vertical portion; the first horizontal portion, the first vertical portion, the second horizontal portion, and the second vertical portion are all in the shape of a flat plate; a plane where the first horizontal portion is located is perpendicular to the plane of the bottom of the junction box body, a plane where the first vertical portion is located is perpendicular to the plane of the bottom of the junction box body, a plane where the second horizontal portion is located is perpendicular to the plane of the bottom of the junction box body, and a plane where the second vertical portion is located is perpendicular to the plane of the bottom of the junction box body.

2. The axial diode junction box according to claim 1, wherein the length of the first connection portion is at least 1 mm, and the length of the second connection portion is at least 1 mm.

3. The axial diode junction box according to claim 1, wherein the width of the first flat portion is at least 2 mm, the thickness of the first flat portion is at least 0.2 mm, the width of the second flat portion is at least 2 mm, and the thickness of the second flat portion is at least 0.2 mm.

4. The axial diode junction box according to claim 1, wherein the length of the first flat portion is at least 2 mm, the length of the second flat portion is at least 2 mm, a distance between the first connection portion and a rear end of the first flat portion is d1, a distance between the second connection portion and a rear end of the second flat portion is d2, the distance d1 is at least 1 mm, and the distance d2 is at least 1 mm.

5. The axial diode junction box according to claim 1, wherein the length of the first vertical portion is at least 2 mm, and the length of the second vertical portion is at least 2 mm.

6. The axial diode junction box according to claim 1, wherein a first hook portion, a support base, a second hook portion, and a block plate are fixedly provided at the bottom of the junction box body; the first hook portion is close to a front end of the junction box body, the second hook portion is close to a rear end of the junction box body, and the block plate is located in the middle of the junction box body; the first hook portion comprises a left first hook portion and a right first hook portion, the left first hook portion and the right first hook portion are arranged in parallel, a distance between the left first hook portion and the right first hook portion is d3, the length of the diode body is d4, the distance d3 matches the length d4, and a plane A where the left first hook portion and the right first hook portion are located is parallel to a plane B where the block plate is located; the support base comprises a left support base and a right support base, and the left support base and the right support base are arranged opposite each other; the second hook portion comprises a left second hook portion and a right second hook portion, the left second hook portion and the right second hook portion are arranged opposite each other, and a distance between the left second hook portion and the right second hook portion is greater than the distance d3; when the axial diode is mounted in the junction box body, the diode body is located between the left first hook portion and the right first hook portion, an outer wall of the diode body abuts against the block plate, the first connection portion abuts against the left first hook portion, the second connection portion abuts against the right first hook portion, the first flat portion is in contact with an upper end surface of the left support base, the second flat portion is in contact with an upper end surface of the right support base, the left second hook portion limits the rear end of the first flat portion, and the right second hook portion limits the rear end of the second flat portion.

7. The axial diode junction box according to claim 1, wherein a third hook portion, a fourth hook portion, a first positioning column, a second positioning column, and a support block are fixedly provided at the bottom of the junction box body; the third hook portion comprises a left third hook portion and a right third hook portion, the left third hook portion and the right third hook portion are arranged in parallel, the fourth hook portion comprises a left fourth hook portion and a right fourth hook portion, the left fourth hook portion and the right fourth hook portion are arranged in parallel, the left third hook portion and the left fourth hook portion are arranged opposite each other, and the right third hook portion and the right fourth hook portion are arranged opposite each other; a plane where the left third hook portion and the left fourth hook portion are located is C, a plane where the right third hook portion and the right fourth hook portion are located is D, the plane C is parallel to the plane D, and a distance between the plane C and the plane D is d5, the length of the diode body is d4, and the distance d5 matches the length d4; the first positioning column and the second positioning column are arranged in a staggered manner, a distance between a left end surface of the first positioning column and a right end surface of the second positioning column is d6, the length of the first horizontal portion is d7, and the distance d6 matches the length d7; when the axial diode is mounted in the junction box body, the diode body is located between the plane C and plane D, the first connection portion is located between the left third hook portion and the left fourth hook portion, the second connection portion is located between the right third hook portion and the right fourth hook portion, the first horizontal portion is located between a rear end surface of the first positioning column and a front end surface of the second positioning column, and the first vertical portion abuts against the support block.

8. A method for manufacturing the axial diode junction box according to claim 1, comprising the following steps:
S1: placing an axial diode into a stamping die, bending and then stamp-flattening a first pin of the axial diode to obtain a first flat portion, and bending and then stamp-flattening a second pin of the axial diode to obtain a second flat portion; or
placing an axial diode into a stamping die, stamp-flattening a first pin of the axial diode and the bending the flattened portion to obtain a first flat portion, and stamp-flattening a second pin of the axial diode and then bending the flattened portion to obtain a second flat portion; and
S2: mounting the shaped axial diode into a junction box body.

\* \* \* \* \*